United States Patent [19]

Whipple, III

[11] Patent Number: 5,546,757
[45] Date of Patent: Aug. 20, 1996

[54] REFRIGERATION SYSTEM WITH ELECTRICALLY CONTROLLED EXPANSION VALVE

[75] Inventor: Walter Whipple, III, Amsterdam, N.Y.

[73] Assignee: General Electric Company, Schenectady, N.Y.

[21] Appl. No.: 301,762

[22] Filed: Sep. 7, 1994

[51] Int. Cl.⁶ ............................. F16K 31/68; F25B 41/04
[52] U.S. Cl. ......................... 62/225; 236/92 B; 251/5; 251/11
[58] Field of Search ................... 62/210, 211, 212, 62/222, 223, 224, 225; 236/68 C, 92 B, 101 R, 99 R, 99 A, 99 J; 251/11, 4, 5

[56] References Cited

U.S. PATENT DOCUMENTS

| | | | |
|---|---|---|---|
| 2,241,086 | 5/1941 | Gould | 251/5 X |
| 2,432,859 | 12/1947 | Carter | 62/225 |
| 3,168,805 | 2/1965 | Fleury | 251/11 X |
| 4,122,687 | 10/1978 | McKee | 62/156 |
| 4,318,529 | 3/1982 | Huelle et al. | 251/11 |
| 4,375,753 | 3/1983 | Imasu et al. | 62/225 X |
| 4,475,686 | 10/1984 | Huelle et al. | 251/11 X |
| 4,481,787 | 11/1984 | Lynch | 62/180 |
| 4,666,081 | 5/1987 | Cook et al. | 251/11 X |
| 4,745,767 | 5/1988 | Ohya | 62/225 X |
| 4,910,972 | 3/1990 | Jaster | 62/335 |
| 4,918,942 | 4/1990 | Jaster | 62/335 |
| 5,103,650 | 4/1992 | Jaster | 62/198 |
| 5,118,071 | 6/1992 | Huelle | 251/11 |
| 5,134,859 | 8/1992 | Jaster | 62/503 |

OTHER PUBLICATIONS

Donald E. Koop et al., "An Adaptive Demand Defrost and Two–Zone Control and Monitor System for Refrigeration Products," IEEE Transactions on Industry Applications, Vol. 24, No. 2, Mar./Apr. 1988, pp. 337–342.
"Thermostatic Expansion Valves," Bulletin 10–10, Oct. 1981, Copyright 1981 by Sporlan Valve Co., St. Louis, MO, pp. 1–8.

Primary Examiner—Harry B. Tanner
Attorney, Agent, or Firm—Donald S. Ingraham; Marvin Snyder

[57] ABSTRACT

An energy-efficient refrigeration system includes an electrically controlled thermal expansion valve disposed in the refrigerant piping so as to control flow of refrigerant in the refrigeration system, and an expansion valve controller coupled to the expansion valve to provide control signals to the valve. The controller includes a refrigerant temperature sensing device coupled to the refrigeration system so as to sense a flow control temperature corresponding to the refrigeration temperature at a flow measurement site so that the controller generates control signals to control valve position to provide optimum refrigerant flow for a particular operational mode of the system. The thermal expansion valve includes a heating element that is responsive to control signals from the controller and that is thermally coupled to a thermal expansion medium so that the medium expands upon application of heat from the heating element.

8 Claims, 1 Drawing Sheet

REFRIGERATION SYSTEM WITH ELECTRICALLY CONTROLLED EXPANSION VALVE

BACKGROUND OF THE INVENTION

This invention relates generally to refrigeration systems and in particular to a refrigeration apparatus having an electrically controlled expansion valve disposed to selectively control refrigerant flow through the system to optimize refrigerant level in an evaporator so as to enhance energy efficiency of the system.

Conventional refrigeration systems having moderate capacity (e.g., less than 5 tons) and typically include a compressor, a condenser, an evaporator, and a fixed expansion device, such as an orifice or capillary tube. The fixed expansion device is positioned so as to introduce a pressure drop in the refrigerant as it passes from the condenser to the evaporator. One factor in determining energy-efficient operation of the refrigeration system is determined by the phase change of the refrigerant from liquid to vapor in the evaporator. On one hand, it is undesirable that liquid refrigerant pass from the evaporator as that would indicate that the cooled air did not reject all of the energy that it could have to the refrigerant (also, liquid refrigerant would damage the compressor); on the other hand, it is undesirable that the refrigerant be significantly superheated as the superheated refrigerant has less density and thus more work is required to compress it (because less mass of refrigerant would be pulled into the cylinder on each intake stroke of the compressor). The optimal evaporator efficiency is obtained when all liquid refrigerant passing into the evaporator undergoes a phase change to vapor, thereby absorbing heat from the cooling air circulating around the other side of the evaporator heat exchanger, but the refrigerant vapor has the least superheat consistent with other evaporator operating constraints (e.g., not passing any liquid to the compressor).

In refrigeration systems used in refrigerators and small heat pump systems (which typically have a capacity of one-half ton or less), the compressor speed is also fixed and thus such systems can be tuned for most energy-efficient operation for only one temperature differential across the evaporator, and that temperature differential is necessarily based on a worse case scenario to avoid product malfunctions under heavy load conditions. As a consequence, under more common normal operating conditions, the refrigeration system does not operate at peak energy efficiency.

Conventional refrigeration systems also typically do not reach their top efficiency until many minutes into an operating cycle (that is, 5–10 minutes after the system has been actuated to address a cooling demand). This delay in reaching an efficient operating point results from the accumulation of vapor in the evaporator after system startup (when the compressor suction causes what liquid refrigerant that is left in the evaporator at the previous shutdown to flash to vapor) and the resultant time to pump the vapor out of the evaporator and raise the level of liquid refrigerant in the evaporator.

It is desirable to improve the energy-efficiency of refrigeration systems by enabling them to meet a range of cooling demands and environmental conditions by controlling the system to respond to the current cooling demands. It is also desirable that the refrigeration system be able to reach an efficient operating regime early in a cooling cycle. The energy saving system should also be readily fabricated and easily adapted to the refrigeration systems presently manufactured such that the cost of acquiring and operating the system does not exceed the economic benefits of the improved energy efficiency.

It is thus an object of this invention to provide a refrigeration system that improves the energy efficiency of the system through selectively controlling refrigerant flow with a variable expansion device.

SUMMARY OF THE INVENTION

In accordance with this invention, an energy-efficient refrigeration system includes an electrically controlled thermal expansion valve disposed in the refrigerant piping so as to control flow of refrigerant in the refrigeration system, and an expansion valve controller coupled to the expansion valve to provide control signals to the valve. The controller includes a refrigerant flow sensing device coupled to the refrigeration system, such as temperature sensor to sense a flow control temperature corresponding to the refrigerant temperature at a flow measurement site so that the controller generates control signals to control valve position to provide optimum refrigerant flow for a particular operational mode of the system. The thermal expansion valve can be used in conjunction with a fixed pressure drop device, such as an orifice or capillary tube.

The thermal expansion valve includes a heating element that is responsive to control signals from the controller and that is thermally coupled to a thermal expansion medium so that the medium expands upon application of heat from the heating element. The thermal expansion medium typically comprises a refrigerant such as Freon (referring generally to the group halogenated hydrocarbons (usually based on methane) containing one or more fluorine atoms, and which are commonly used as refrigerants) or the like. In one embodiment, the thermal expansion valve has a bellows mechanism which is coupled to a valve stem and that moves in response to the differential pressure applied by the thermal expansion medium on one side of the bellows. In another embodiment, the thermal expansion medium further comprises an elastomer material and is disposed in a cylindrical shaped chamber with an orifice disposed axially therethrough such that the size of the orifice is determined by the volume of the thermal expansion material.

The expansion valve controller typically is a pulse width modulated control circuit to provide control signals to the thermal expansion valve; alternatively an analog control device can be used. The controller further has a refrigeration system cycle module that further controls the position of the expansion valve based upon factors other than the temperature sensor.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
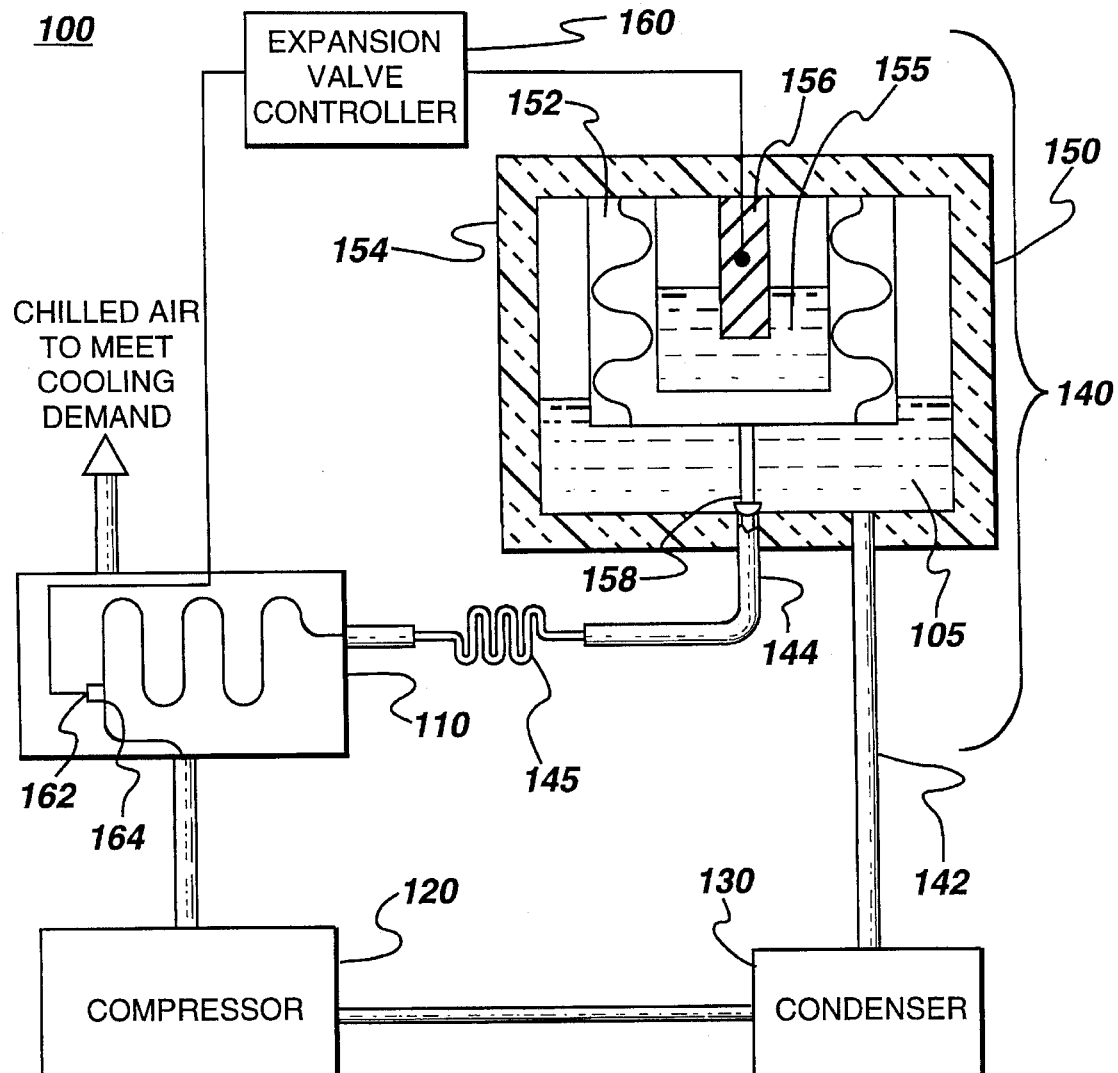
FIG. 1 is a partial schematic and partial block diagram of a refrigeration system having an electrically controlled thermal expansion valve in accordance with one embodiment of this invention.

A refrigeration system 100 in accordance with this invention operates to cool another medium. Typically, the other medium is cooling air that is used to meet a cooling demand, such as in a refrigerator or room air conditioner; alternatively, other gasses or liquids, such as water (e.g., in a direct ice maker), may comprise the medium cooled. Refrigeration system 100 is of a moderate capacity or smaller, that is having a capacity of not more than five tons, and commonly less than 1 ton, e.g., 0.1 ton or the like for consumer appliances such as refrigerators. As used herein, "refrigeration system" refers to devices or combinations of devices that use the phase change of a refrigerant fluid to chill (that is, reduce the temperature of) a cooling-air flow to a temperature sufficiently low to provide the desired temperatures to meet the cooling demand. In the present invention, such a system typically comprises an evaporator 110, a compressor 120, a condenser 130, and an electrically controlled thermal expansion device 140, which are coupled together such that refrigerant compressed by compressor 120 is condensed in condenser 130, passes through expansion device 140 into evaporator 110, in which the refrigerant absorbs heat to chill the cooling air that will pass into the compartments of the refrigerator or the like. Evaporator 110 is coupled to compressor 120 such that the heated (and now-gaseous) refrigerant fluid that enters the compressor is again compressed. Condenser 130 and evaporator 110 are each heat exchangers which transfer energy from and into the refrigerant respectively. The refrigerant fluid is a liquid-to-gas (and back) phase changing material adapted for a particular refrigeration system; Freon 12, Freon 134A, Freon 134B, ammonia, propane, or the like are common examples of refrigerants. Refrigeration system 100 further typically comprises means for directing the flow of chilled air to meet a particular cooling demand. One example of an air-flow control device in a refrigerator that is advantageously used with the electrically controlled expansion valve of the present system is disclosed in co-pending application Ser. No. 08/301,761, entitled "Refrigerator Multiplex Damper System", which is assigned to the assignee herein and incorporated herein by reference.

In accordance with this invention, expansion device 140 comprises an electrically controlled and thermally operated expansion valve 150 and an expansion valve controller 160. As used herein, "thermally operated expansion valve" refers to a valve that is thermally operated by an externally applied electrical signal that is converted into heat to cause valve movement (as opposed to a remote thermal sense bulb type system, in which pressure generated by a refrigerant type gas in a sensor module is transmitted to a valve actuator to move the valve ). Thus, the electrical signal is used to control addition or removal of heat energy to control the valve position and thus control refrigerant flow (and pressure drop) through the expansion device. Thermal expansion valve 150 is coupled via an inlet pipe 142 to receive compressed and condensed system refrigerant 105 from condenser 130. As used herein, "system refrigerant" refers to the refrigerant that is circulated in refrigeration system 100 so as to chill the medium, such as cooling air, that is used to meet the cooling demands on system 100. The system refrigerant flows between compressor 120, condenser 130, and evaporator 110. System refrigerant 105 passing from expansion valve 150 passes through outlet pipe 144 to evaporator 110. Thermal expansion valve 150 may be used as the only expansion device in the refrigeration system 100, or alternatively, in conjunction with a fixed expansion device 145, such as a capillary tube or an orifice, to provide the desired pressure drop (and refrigerant flow) between the condenser and the evaporator. Such a fixed expansion device can be used in combination with thermal expansion valve 150 to tune the refrigeration system for use with an available expansion valve. For example, a fixed expansion device can limit the range of a thermal expansion valve.

One embodiment of thermal expansion valve 150 is illustrated in FIG. 1 by way of example and not limitation; this valve comprises a bellows mechanism 152 movably disposed within a thermally-insulated valve body 154. A heating element 156 that is electrically coupled to expansion valve controller 160 is disposed within bellows mechanism 152. Bellows mechanism 152 is further coupled to a system refrigerant valve operator 158 such that valve operator 158 moves in correspondence with bellows mechanism 152; valve operator 158 thus seats or opens the expansion valve in response to the position of bellows mechanism, thereby controlling the flow rate of system refrigerant 105 through valve 150.

By way of example and not limitation, a thermal expansion medium 155 is disposed in the interior of bellows mechanism 152 such that it is thermally coupled with heating element 156, e.g., heating element 156 is disposed within the reservoir of thermal expansion medium 155 inside bellows mechanism 152. Thermal expansion medium comprises a material that expands upon application of heat by heating element 156 to a degree to displace bellows mechanism sufficiently to move valve operator 158 through a desired range of travel. Thermal expansion medium typically comprises a valve refrigerant of the same type as the system refrigerant, but alternatively may comprise combinations of refrigerant types or materials such as wax. Expansion of thermal expansion medium 155 in response to heat applied by heating element 156 results in increased pressure within bellows mechanism such that the differential pressure displaces bellows mechanism (causing the mechanism to elongate, in the arrangement illustrated in FIG. 1) so that valve operator 158 is displaced towards the valve-seated position, thus restricting flow of system refrigerant between inlet pipe 142 and outlet pipe 144. As illustrated in FIG. 1, typically bellows mechanism is disposed in valve body 154 such that it is at least partially immersed in system refrigerant 105. In this arrangement the system refrigerant provides both a heat sink to help dissipate heat from the thermal expansion medium when heating element 156 is deenergized (and it is desired to open valve 150 to increase refrigerant flow) and a pressure source for the differential pressure between the interior and exterior of bellows mechanism 152. Alternatively, other means of generating a differential pressure across bellows mechanism 152 can be used, such as a spring or the like. Additionally, it is noted that the thermal expansion valve can readily be adapted to operate in the reverse manner of that described above by repositioning the valve seat and valve on arm 158 such that, when heat is applied, the valve operates to open position. In such a device, with no heat applied, the valve would close (that is, act to hold refrigerant in the condenser in the system arrangement shown in FIG. 1).

Figure 2:
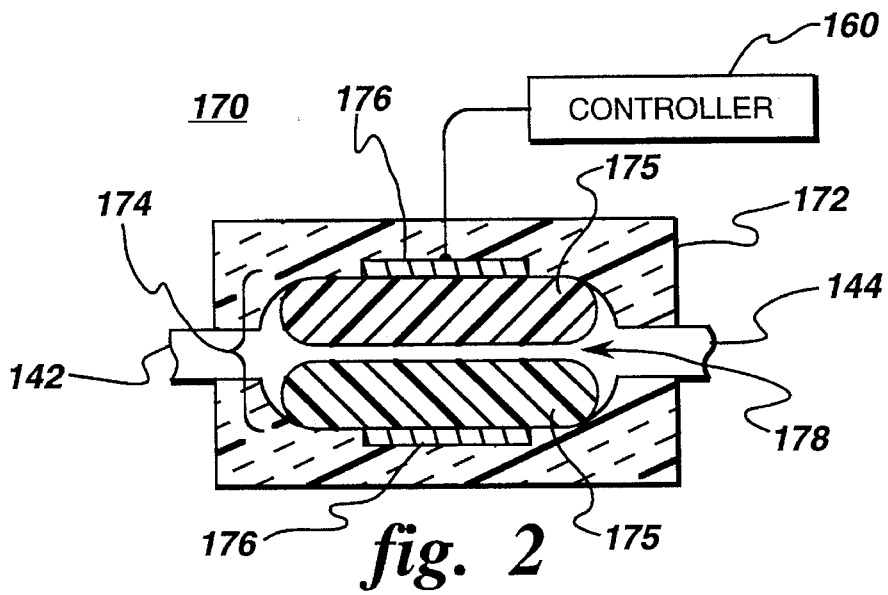
FIG. 2 is a cross-sectional view of a thermal expansion valve in accordance with another embodiment of the present invention.

In an alternative embodiment, expansion device 140 comprises a thermal expansion valve 170 as illustrated in FIG. 2. Expansion valve 170 comprises a thermally-insulated valve body 172 having a chamber 174 disposed between inlet pipe 142 and outlet pipe 144. Chamber 174 is typically cylindrically-shaped; alternatively chamber 174 may comprise a square, rectangular, or elliptical shape. Thermal expansion medium 175 is disposed in chamber 174 such that an orifice 178 is formed therein along an axis between the inlet and outlet of chamber 174; thermal expansion medium comprises an elastomer material such as silicone that is impregnated with a refrigerant material such as Freon (referring generally to the group halogenated hydrocarbons (usually based on ethane) containing one or more fluorine atoms, and which are commonly used as refrigerants), propane, butane, or the like, such that the volume of medium 175 varies in correspondence with its temperature (that is, the rise in temperature results in expansion of the refrigerant material embedded in the elastomer so that the elastomer material expands (or stretches) to increase the volume of medium 175). Heating elements 176 are thermally coupled to medium 175 to allow the application of heat to the medium to control the size of orifice 178 and thereby control refrigerant flow through valve 170.

In accordance with this invention expansion valve 150, or alternatively, expansion valve 170, is electrically coupled to compressor controller 160, which comprises an analog controller, a digital controller, a microprocessor (also referred to as a micro-controller), or the like which is adapted to generate expansion valve control signals that control the application of energy to heating elements 156, or alternatively, 176. Controller 160 typically further comprises a refrigerant temperature sensing device 162 that is coupled to refrigeration system 100 at a flow measurement site 164. Flow measurement site 164 is typically situated in evaporator 110 at a position near the system refrigerant outlet from the evaporator (to the compressor). Temperature sensor 162 which comprises a thermocouple, a thermistor, a positive temperature coefficient resistor, a negative coefficient temperature resistor, or the like provides a signal to controller 160 corresponding to the temperature of the system refrigerant flowing through the outlet of the evaporator, which temperature is correlated in controller 160 to the phase of the system refrigerant passing from the evaporator. Alternatively, a temperature sensitive switch, positive temperature control resistor, negative temperature control resistor, or similar device that provides an abrupt change in current passed at a predetermined temperature can alone comprise both the sensor element and controller in a simple system in which it is desired to actuate the valve at only one temperature.

For optimal efficiency of refrigeration system 100 it is desirable that a large portion of the heat exchange surface of evaporator 110 be used in chilling the cooling air. It is desirable to maintain refrigerant flow so that substantially all of the refrigerant flashes to vapor at or near the end of its flow path in the evaporator. Efficiency of the evaporator is improved when the amount of surface area in the evaporator heat exchanger across which energy is transferred to change refrigerant phase is maximized; in accordance with this invention, refrigerant flow can be controlled to maximize the heat exchange area of the evaporator across which the refrigerant is vaporized for different cooling demands on the refrigeration system.

Consequently, if the refrigerant flow sensor 162 temperature rises above a selected value (e.g., corresponding to a small amount of superheat above the refrigerant phase change temperature at the pressure in the evaporator), efficiency is reduced because the maximum heat transfer occurs when the refrigerant undergoes a phase change (which has a corresponding refrigerant boiling temperature for a given refrigerant pressure). In this situation, when the refrigerant is becoming superheated, controller 160 generates control signals to cause increased refrigerant flow (e.g., for the system illustrated in FIG. 1, reducing power to heating element 156 to allow thermal expansion valve 150 to open and allow more refrigerant flow therethrough). Conversely, the presence of liquid refrigerant, as indicated by a sudden decrease in flow sensor 162 temperature (e.g., from a superheat temperature to the boiling temperature for the refrigerant pressure at that point in the evaporator) at flow measurement site 164 indicates that the cooling demand is not great enough to cause all of the refrigerant to vaporize and thus refrigerant flow should be reduced to optimize refrigerator system efficiency. In this situation, controller 160 generates valve control signals that, for example, energize heater 156 to increase the temperature of thermal expansion medium 155 and thus close down (that is, reduce the flow rate through) valve 150 and reduce flow of system refrigerant 155 into evaporator 110. The valve control signals may compose analog or linear signals, or alternatively may comprises digital signals (on-off) that are selectively applied to provide the desired temperature.

Controller 160 further may comprise a refrigeration system cycle module (not shown) that is coupled to a controller for refrigeration system 100 (not shown), that is, the control system that determines cooling demand and activates refrigeration system (e.g., turning on compressor 120 and associated cooling air fans). One example of such a refrigeration system controller is disclosed in copending application entitled "Energy Efficient Refrigerator Control System," Ser. No. 08/301,764, which is assigned to the assignee herein and is incorporated herein by reference. In this arrangement, controller 160 can further generate control signals for expansion valve 150 to shut the valve (typically valve 150 and 170 are adapted to be able to close off refrigerant flow) near the end of an operation cycle of the refrigeration system. That is, when the cooling demand has been satisfied, controller 160's system cycle module generates control signals to heating elements in the thermal expansion valve to cause the valve to close; in this way, liquid refrigerant is stored in the condenser as of the completion of a cooling cycle (i.e., operation of refrigeration system 100 to meet a cooling demand), which enables refrigeration system 100 to achieve improved efficiency rapidly after the start of the next cooling cycle because the condenser, expansion device and associated tubing contain liquid refrigerant.

Controller 160 further typically comprises a pulse width modulated (PWM) power control circuit (not shown) for passing control signals to thermal expansion valve device 140. The PWM power control circuit provides signals allowing the energizing of the heating elements periodically (that is, the application of power to the heating elements need not be constant (or linear) in order to maintain a desired valve position), thereby consuming less power in the controlling circuitry. Temperature sensor 162 may comprise, for example, positive temperature coefficient resistors (or, alternatively, negative temperature coefficient resistors), and thermally activated switches which devices can be adapted for a desired temperature profile, such as to allow increased current flow abruptly at a set point temperature. Use of such sensors for temperature sensor 162 is electrically efficient as such devices can be operated from AC or DC power supplies and can be adapted to be used with a broad range of applied voltages from less than 5 volts to greater than 300 volts. In operation, thermal expansion valve device 140 thus provides refrigerant flow control in refrigeration system 100 to improve the energy efficiency of the system, in particular by controlling refrigerant flow to optimize heat exchange in evaporator 110.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An energy-efficient refrigeration system comprising:

an electrically controlled thermal expansion valve disposed in refrigerant system piping so as to control flow of refrigerant in said refrigeration system; and an expansion valve controller coupled to said thermal expansion valve to provide a control signal thereto, said controller comprising a refrigerant flow sensing device coupled to said refrigeration system to sense a flow control temperature corresponding to refrigerant temperature at a flow measurement site, whereby said thermal expansion valve selectively controls refrigerant flow in said refrigeration system in response to said controller;

said thermal expansion valve comprising an orifice chamber, a variable-sized orifice through which the system refrigerant passes, a thermal expansion medium, and a heating element thermally coupled to said thermal expansion medium, said thermal expansion medium comprising a refrigerant-filled elastomer material disposed within said orifice chamber such that the size of said orifice corresponds to the volume of said refrigerant-filled elastomer material, said volume being determined by the pressure of said thermal expansion medium, the volume of said thermal expansion medium being responsive to energy supplied by said heating element.

2. The refrigeration system of claim 1 wherein said thermal expansion medium disposed in said orifice chamber has a cylindrical shape with said orifice being disposed axially through the cylindrical-shaped thermal expansion medium.

3. The refrigeration system of claim 1 wherein said expansion valve controller comprises a temperature sensitive element selected from the group consisting of a positive temperature coefficient resistor, a negative temperature coefficient resistor, a thermistor, a thermocouple, and a temperature sensitive switch.

4. The refrigeration system of claim 3 wherein said expansion valve controller comprises a pulse width modulated control circuit for passing said control signals to said thermal expansion valve.

5. The refrigeration system of claim 1 wherein the capacity of said refrigeration system is not greater than five tons.

6. The refrigeration system of claim 1 wherein said flow measurement site for said refrigerant temperature sensing device is on an evaporator in said refrigeration system.

7. The refrigeration system of claim 1 further comprising a compressor apparatus, a condenser, and an evaporator coupled together so as to allow system refrigerant to flow sequentially therethrough, said thermal expansion valve being disposed between said condenser and said evaporator.

8. The refrigeration system of claim 7 further comprising a fixed expansion device coupled between said condenser and said evaporator.

\* \* \* \* \*